United States Patent [19]

Farrar

[11] 4,377,666

[45] Mar. 22, 1983

[54] AGE-RESISTANT POLYMERS CONTAINING CHEMICALLY BOUND ANTIOXIDANT FUNCTIONAL GROUPS

[75] Inventor: Ralph C. Farrar, Bartlesville, Okla.

[73] Assignee: Phillips Petroleum Company, Bartlesville, Okla.

[21] Appl. No.: 293,737

[22] Filed: Aug. 17, 1981

[51] Int. Cl.$^3$ .............................. C08F 8/00; C08F 8/32
[52] U.S. Cl. .................................... 525/132; 525/375; 525/386
[58] Field of Search ................ 525/333, 335, 375, 386

[56] References Cited

U.S. PATENT DOCUMENTS

| | | | |
|---|---|---|---|
| 3,281,383 | 10/1966 | Zelinski et al. | 260/23.7 |
| 3,551,392 | 12/1970 | Snyder et al. | 260/78.4 |
| 3,594,452 | 7/1971 | De La Mare et al. | 260/880 |
| 3,658,769 | 4/1972 | Kline | 260/78 UA |
| 3,766,301 | 10/1973 | De La Mare et al. | 260/879 |
| 4,098,709 | 7/1978 | Hanauer et al. | 252/51.5 A |
| 4,107,144 | 8/1978 | Russell et al. | 526/212 |
| 4,138,389 | 2/1979 | Edwards | 260/45.7 R |
| 4,304,886 | 12/1981 | Bean, Jr. et al. | 525/386 |

*Primary Examiner*—Stanford M. Levin

[57] ABSTRACT

Conjugated diene homo- or copolymers having chemically bound antioxidant functional groups are prepared by the reaction of polymer-alkali metal with certain antioxidants containing a functional group reactable polymer-alkali metal, providing both coupling and bound anti-oxidant groups. These polymers having antioxidant functional groups chemically attached into the polymer chain have better aging stability than similar polymers containing non-bound antioxidants.

25 Claims, No Drawings

AGE-RESISTANT POLYMERS CONTAINING CHEMICALLY BOUND ANTIOXIDANT FUNCTIONAL GROUPS

BACKGROUND OF THE INVENTION

Essentially all types of rubber, both natural and synthetic, and particularly rubbers formed from conjugated dienes, are known to be susceptible to deterioration resulting from prolonged exposure to oxidative aging.

Improved aging stability of polymers is of high interest. Particularly important are non-extractable antioxidants which are desirable for food contact end uses. Elastomers and resinous materials having low volatiles are required in many end uses, yet non-bound antioxidants are volatile.

Much effort has been expended in the field of polymer technology to develop various stabilizers that will inhibit effectively the adverse effects of aging of polymeric compositions.

Antioxidants for the most part are mixed with or compounded with various polymers. However, such admixed stabilizers frequently are lost in further compounding, utilization, admixing, blending, and the like, or leached out in use of the polymer, or even volatilized when the polymeric products are exposed to elevated temperatures over prolonged periods of time.

Efforts to bind the antioxidant to the polymer have been employed in the past, but have used or required large amounts of reactive antioxidant. U.S. Pat. No. 4,138,389 prepares a low molecular weight polymer containing a multiplicity of functional groups which are reactable with certain stabilizers to form a material then dilutable with untreated polymer.

U.S. Pat. No. 4,098,709 uses a carboxylic acid group-containing polymer which is reacted with a hindered phenol in order to put the protective entity along the chain wherever the carboxylic acid group may be found. U.S. Pat. No. 4,107,144 copolymerizes a dialkylphenol antioxidant with a vinylic group containing monomer by means of a Friedel-Crafts catalyst to produce thereby a bound antioxidant-containing polymer. U.S. Pat. No. 3,658,769 copolymerizes certain nitrogen-containing compounds with one or more comonomers in order to try to achieve an antioxidant-property exhibiting polymer.

Needed, still, are improved methods of introducing antioxidant functions by chemical methods.

BRIEF SUMMARY OF THE INVENTION

That is exactly what I have discovered: A method of introducing chemically bound antioxidant functional groups into the polymeric structure itself, by the novel and unobvious approach of utilizing a group of coupling agents to perform both the coupling action in producing a polymer of increased molecular weight plus introducing thereby the antioxidant functional groups which in the coupling action become bound into the polymeric chain, thus providing a more stable structure which is nonleachable. The antioxidants bound into the polymer are non-extractable and non-volatile which is important for certain food-contact end-uses (FDA applications).

It is indeed surprising that the coupling moiety so effectively provides aging protection, since the coupling moiety is so small compared to the total molecule size of the coupled polymer.

By my invention, elastomers and resins contain chemically bound antioxidants providing improved aging, non-extractability, and non-volatile protection.

Further important is the fact that by my method, a coupling reaction is employed which is a usual step in producing polymers. Thus, no secondary blending or mixing or other reaction is involved to introduce or add an antioxidant to the elastomer or resinous polymer or copolymer.

DETAILED DESCRIPTION OF THE INVENTION

The agents which I employ both as coupling agents and to furnish the chemically bound antioxidant functional groups into the coupled polymers include the following generic types:

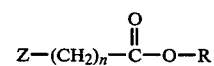   I wherein Z is the 3,5-di-tert-butyl-4-hydroxyphenyl moiety, i.e.

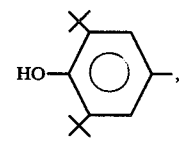

n is 0–4, and R is an alkyl radical of 1–24 carbon atoms

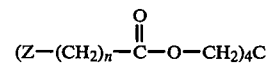   II wherein Z and n are as defined above.

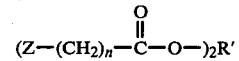   III wherein Z and n are as defined above and R' is an alkylene radical of 2–10 carbon atoms.

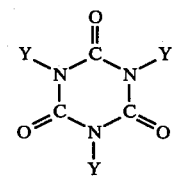   IV wherein Y is Z—(CH$_2$)$_n$— and Z and n are as defined above.

Presently preferred species include the following: n-octadecyl[3-(3,5-di-tert-butyl-4-hydroxyphenyl)]-propanoate (available commercially as Irganox 1076)

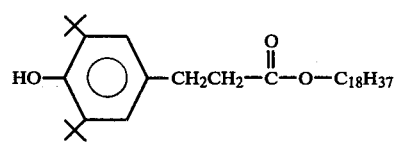   V tetrakis[3-(3,5-di-tert-butyl-4-hydroxyphenyl)propionyloxymethyl]methane (available commercially as Irganox 1010)

VI

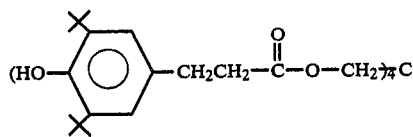

1,6-hexanediyl di[3-(3,5-di-tert-butyl-4-hydroxyphenyl)propanoate] (available commercially as Irganox 259)

VII

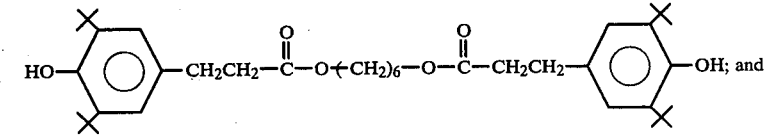

tris-1,3,5-(3,5-di-tert-butyl-4-hydroxyphenylmethyl-1,3,5-triazacyclohexan-2,4,6-trione (available commercially as Goodrite 3114 or Mark 1589)

VIII

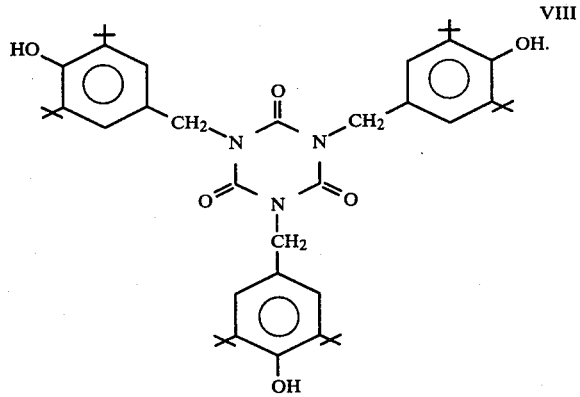

The Irganox materials are trademark products of Ciba-Geigy Corp. The Mark material is a trademark product of Argus Chemical Co. The Goodrite material is a trademark of B. F. Goodrich Co.

POLYMERS APPLICABLE

My invention is applicable to the coupling of living polymer molecules prepared from at least one conjugated diene employing an alkali metal initiator, such that the polymer has an alkali metal attached to the terminal monomer unit of the polymer chain.

The conjugated diene polymers containing the terminal reactive alkali metal groups treated in accordance with my invention are polymers obtained by the polymerization of one or more conjugated dienes alone, or with any of the other vinylidene group-containing comonomers known to be polymerizable with alkali metal based initiators, as is well known in the art. By "with" I means either in admixture with, or in sequential admixture with or by sequential addition polymerization to or with one or more vinylidine group-containing comonomers, presently preferably the monovinylarenes.

While the invention is applicable generally to the conjugated diene polymerization employing an alkali metal initiator or alkali metal based initiator, I presently consider that my invention is particularly applicable to the rubbery polymers of conjugated dienes and the resinous or rubbery copolymers of conjugated dienes with monovinylarenes, and most particularly polybutadienes and butadiene-styrene random or block copolymers prepared with an alkyllithium, preferably butyllithium, initiators to produce lithium-terminated living polymers. The conjugated dienes ordinarily contain 4 to 12 carbon atoms per molecule, with those containing from 4 to 8 carbon atoms presently preferred. Examples of such diene monomers include 1,3-butadiene, isoprene, 2,3-dimethyl-1,3-butadiene, piperylene, 3-butyl-1,3-octadiene, 2-phenyl-1,3-butadiene, and the like.

Copolymerizable vinylidene group-containing comonomers copolymerizable with alkali-based initiators under solution polymerization conditions are well-known and need not be recited. The preferred monovinylarenes include styrene, α-methylstrene, 1-vinylnaphthalene, 2-vinylnaphthalene and the alkyl, cycloalkyl, aryl, alkaryl, and aralkyl derivatives thereof in which the total number of carbon atoms in the combined substituents usually is not greater than 12. Examples of such substituted monomers include 3-methylstyrene, 4-methylstyrene, 4-n-propylstyrene, 4-cyclohexylstyrene, 4-dodecylstyrene, 4-tertiarybutylstyrene, 2-ethyl-4-benzylstyrene, 4-tolylstyrene, 4-(4-phenyl-n-butyl)styrene, and the like.

The conjugated dienes and/or the monovinylarenes and/or other comonomer can be polymerized alone or in admixture to form homopolymers, or random and block copolymers including tapered block copolymers. Monomers presently preferred are butadiene, isoprene, and styrene due to their availability and relatively low cost. The weight ratio of conjugated diene:monovinylarene monomers in copolymerizations can range broadly from about 99:1 to 1:99, but ordinarily from 95:5 to 5:95.

Polymerization conditions known in the art can be employed for the polymerization of monomers with the alkali metal based initiators. Hydrocarbon diluents usually are employed. Pressure employed should be sufficient to maintain the polymerization admixture substantially in the liquid phase. Temperatures in the range of such as about −50° C. to 200° C. can be employed and depend on the monomers and initiator chosen, as well as the diluent, as is known in the art. Polymerization times vary over a wide range, generally dependent on other polymerization reaction parameters. It is presently preferred that the parameters for polymerization be selected so that substantially or essentially complete conversion of monomers to polymers is obtained prior to the coupling reaction.

My invention generally is applicable to processes for the polymerization of the described monomers in a hydrocarbon diluent, employing an alkali metal as the initiator, or an organoalkali metal compound corresponding to the general formula $R''M_x$ as initiator. For the organoalkali metal initiators, $R''$ is a hydrocarbyl radical and can be aliphatic, cycloaliphatic, or aromatic, x is an integer of 1 to 4, and M represents the alkali metal, and can be lithium, sodium, potassium, cesium, or rubidium, presently preferably for commercial availability lithium.

The amount of initiator employed in producing the polymers or copolymers as known in the art can be varied over a wide range, and is generally selected dependent on the ultimate molecular weight for the resulting product, since the molecular weight of the living polymer-alkali metal substantially is inversely proportional to the amount of initiator employed. Hence, the amount employed is based on initiator level-polymer molecular weight relationships as known in the art. Typically, the amount employed is in the range of about 0.1 to 40 gram milliequivalents per 100 grams of monomers polymerized.

Suitable diluents for the polymerization include any of the commonly employed paraffins, cycloparaffins, and/or aromatic hydrocarbons, such as 4 to 10 carbon atoms per molecule, typically pentane, hexane, cyclopentane, cyclohexane, isooctane, benzene, toluene, and the like. Presently preferred is hexane or cyclohexane or mixtures theeof.

Polymerization, of course, is conducted in the substantial absence of air or moisture, preferably under an inert atmosphere such as nitrogen, as is well known in the art.

The resulting living polymers contain, of course, one or more alkali metal terminated ends, wherein the alkali metal derived from the initiator is positioned at an end of the polymer chain. Of course, when a difunctional initiator is employed $R''M_2$, then normally the living polymer will contain two ends each containing an alkali metal, and so on. Of course, all alkali metal entities do not ultimately result in a polymer-alkali metal, as there is some attrition from traces of oxygen, moisture, and the like, since such impurities present do tend to reduce the amount of alkali metal-terminated polymer formed.

TERMINATION (COUPLING)

In accordance with my invention, the antioxidant functional group-containing coupling agent can be introduced into the polymerization reaction mixture in any suitable manner. It can be added to the mixture at any time during or after the polymerization reaction and, it can be added in small quantities either intermittently or continuously during the course of the reaction. Typically it is added following completion of the monomer polymerization.

The amount of coupling agent employed generally will be about 0.01 to 2.0 part per 100 parts of polymer (when added after completion of polymerization) or 100 parts of monomer charge (when added during the polymerization reaction). Preferably, the amounts employed are about 0.03–1.5 parts on the basis described. However, better coupling results are obtained if a range of about 0.03 to 0.2 parts is employed for those reagents having generic formula IV described above.

The coupling agent containing chemically bound antioxidant functional groups must be added before any material such as water, acid, alcohol, antioxidant, or carbon dioxide is added to inactivate and/or remove the lithium or other alkali metal atoms attached to the terminal monomer unit of the polymer chain. The temperature suitable for conducting the coupling reaction, i.e. reaction of polymer-alkali metal wich carbamic acid ester, can vary over a broad range and is conveniently the same temperature used for the monomer polymerization. Typically the coupling reaction is conducted at a temperature within the same range described earlier for the polymerization reaction. The time for conducting the coupling reaction can be up to 24 hours, more usually from about 10 seconds to 10 minutes. The pressure employed for the coupling reaction can be below or above atmospheric and is preferably and conveniently the autogenous pressure.

POLYMER RECOVERY

Following completion of the coupling reaction, the coupled polymer, which still contains bound alkali metal atoms in the form of O-M bonds, is treated to remove the alkali metal from the polymer although this is not essential to the process. Suitable treating agents include such as alcohol, acid, water, and carbon dioxide, alone or in combination. The alkali metal-free polymer can be isolated by typical procedures, such as solvent flashing, coagulation using a non-solvent for the polymer such as isopropyl alcohol, or steam stripping.

Polymers produced by the process of this invention are suitable for preparing hoses, V-belts, tires, gaskets, shoe soles, wire coating, film, containers, tubes, and many other articles.

EXAMPLES

The examples following demonstrate various aspects of my invention. Specific materials employed, particular relationships, species, amounts, and the like, should be considered as further illustrative of my invention and not as limitative of the reasonable scope thereof.

EXAMPLE I

Runs were carried out in capped beverage bottles employing Irganox 1076, n-octadecyl[3-(3,5-di-tert-butyl-4-hydroxyphenyl)]propanoate, as a coupling agent for copolymers of butadiene and styrene prepared with n-butyllithium in the presence of a small amount of tetrahydrofuran (THF). Under such conditions a "tapered" block polymer structure is formed. The polymerization Recipe I and reaction procedure is shown below:

| Polymerization Recipe I | |
|---|---|
| | Parts by wt. or (mhm)[a] |
| 1,3-Butadiene | 75 |
| Styrene | 25 |
| Cyclohexane | 760 |
| THF | 0.07 |
| n-Butyllithium | (1.6) |
| Temperature, °C. | 70 |
| Time, minutes | 60 |
| Irganox 1076 (cyclohexane solution 0.0697 g/mL) | variable |
| Temperature, °C. | 70 |
| Time, minutes | 15 |

[a]mhm = millimoles per 100g of monomers.

Charge order: Cyclohexane, $N_2$ purge 3 minutes, THF, styrene, butadiene, n-butyllithium, react at 70° C. for 60 minutes, Irganox 1076, react at 70° C. for 15 minutes, add 1.0 phr 2,6-di-tert-butyl-4-methylphenol, coagulate polymer solution with isopropyl alcohol, separate polymer and vacuum dry.

The results are presented in Table I below:

TABLE I

| Run No. | Irganox 1076 phr | Inherent Viscosity[a] | Mooney Viscosity (ML-4)[b] | Heterogeneity Index[c] |
|---|---|---|---|---|
| 1 | 0 | 1.04 | 89 | 1.06 |
| 2 | 0.10 | 1.18 | 94 | 1.17 |
| 3 | 0.20 | —[d] | 87 | — |
| 4 | 0.30 | — | 87 | — |
| 5 | 0.50 | 1.24 | 91 | 1.18 |
| 6 | 0.75 | — | 88 | — |
| 7 | 1.0 | 1.21 | 88 | 1.18 |
| 8 | 1.5 | 1.23 | 87 | 1.18 |
| 9 | 0 | 1.02 | 92 | 1.06 |

[a]According to U.S. Pat. No. 3,278,508 col. 20 note (a) with the modification that the solution was not filtered through a sulfur absorption tube but rather a sample of the solution was filtered through a fritted glass filter stick of grade C porosity and pressured directly into the viscometer.
[b]ASTM D-1646-63 Mooney Viscometer, large rotor, 4 minutes, 212° F.
[c]Wt. Ave. Molecular Wt./Number Ave. Molecular Wt. as determined from gel permeation chromatography curves.
[d]Dash indicates not determined.

The inherent viscosity and heterogeneity index results show that coupling did occur though with apparently low efficiency. The Mooney Viscosity results were inconclusive.

EXAMPLE II

Further runs were conducted using Irganox 1076 as a coupling agent for random butadiene/styrene copolymers. The polymerization Recipe II and charge order are presented below. These runs were conducted in capped beverage bottles.

| Polymerization Recipe II | |
|---|---|
| | Parts, by wt. or (mhm) |
| 1,3-Butadiene | 75 |
| Styrene | 25 |
| Cyclohexane | 760 |
| THF | 1.5 |
| n-Butyllithium | (1.3) |
| Temperature, °C. | 70 |
| Time, minutes | 60 |
| Irganox 1076 | variable |
| Temperature, °C. | 70 |
| Time, minutes | 15 |

Charge Order: Same as Example I.

The results obtained are given in Table II:

TABLE II

| Run No. | Irganox 1076 phr | Inherent Viscosity[a] | Mooney Viscosity (ML-4)[a] | Heterogeneity Index[a] |
|---|---|---|---|---|
| 1 | 0 | 1.33 | 28.5 | 1.17 |
| 2 | 0.10 | 1.53 | 48.5 | 1.27 |
| 3 | 0.20 | 1.57 | 51 | 1.27 |
| 4 | 0.30 | —[b] | 45 | — |
| 5 | 0.50 | 1.55 | 47 | 1.25 |
| 6 | 0.75 | — | 41 | — |
| 7 | 1.0 | 1.45 | 41 | 1.23 |
| 8 | 1.5 | 1.53 | 45 | 1.24 |
| 9 | 0 | — | 28.5 | — |

[a]See footnotes for these columns in Table I.
[b]Dash indicates not determined.

The results of Table II show that Irganox 1076 was an effective coupling agent for the random butadiene/styrene (75/25) copolymers.

EXAMPLE III

Runs were carried out in which Irganox 1076 was employed as a coupling agent for polybutadiene. The recipe and charge order are shown below in Recipe III.

| Polymerization Recipe III | |
|---|---|
| | Parts, by wt. or (mhm) |
| 1,3-Butadiene | 100 |
| Cyclohexane | 760 |
| THF | 0.07 |
| n-Butyllithium | variable |
| Temperature, °C. | 70 |
| Time, minutes | 60 |
| Irganox 1076 | variable |
| Temperature, °C. | 70 |
| Time, minutes | 15 |

Charge order: Essentially the same as Example I except no styrene present.

The results are shown in Table III:

TABLE III

| Run No. | n-BuLi mhm | Irganox 1076 phr | Mooney Viscosity (ML-4)[a] |
|---|---|---|---|
| 1 | 1.2 | 0 | 22.5 |
| 2 | " | 0.10 | 44 |
| 3 | " | 0.20 | 48.5 |
| 4 | " | 0.30 | 38 |
| 5 | " | 0.50 | 37 |
| 6 | " | 0.75 | 36.5 |
| 7 | " | 1.00 | 41 |
| 8 | " | 1.25 | 36 |
| 9 | 1.4 | 0 | 8.5 |
| 10 | " | 0.10 | 15 |
| 11 | " | 0.20 | 21 |
| 12 | " | 0.30 | 19.5 |
| 13 | " | 0.50 | 17.5 |
| 14 | " | 0.75 | 19.5 |
| 15 | " | 1.00 | 15.5 |
| 16 | " | 1.25 | 19 |

[a]Footnote [b] Table I.

The results of Table III show that Irganox 1076 was effective in coupling polybutadienes initiated with n-butyllithium.

EXAMPLE IV

Further runs were made in which Irganox 1076 was used to couple polybutadienes initiated with n-butyllithium (1.0 mhm). These runs were also performed with capped beverage bottles. The polymerization recipe and charge order were essentially the same as those of Example III. The results are shown in Table IV:

TABLE IV

| Run No. | phr | Viscosity[a] | (ML-4)[a] | Heterogeneity Index[a] |
|---|---|---|---|---|
| 1 | 0 | 1.98 | 36.5 | 1.09 |
| 2 | 0.10 | 2.52 | 83.5 | 1.23 |
| 3 | 0.20 | 2.42 | 75 | 1.23 |
| 4 | 0.30 | 2.39 | 70.5 | 1.26 |
| 5 | 0.50 | 2.35 | 66 | 1.22 |
| 6 | 0.75 | 2.31 | 62 | 1.22 |
| 7 | 1.0 | 2.27 | 56.5 | 1.20 |
| 8 | 0 | 2.00 | 34.5 | 1.07 |

[a]See footnotes of Table I.

The results of Table IV again demonstrate that Irganox 1076 was effective as a coupling agent for polybutadienyl-Li.

EXAMPLE V

Runs were conducted to prepare two polybutadienes to the same Mooney Viscosity (50 ML-4). Polymer A was made according to my invention by use of Irganox 1076 as a coupling agent followed by the addition of 2 mL isopropyl alcohol to the coupled polymer solution, then coagulation, recovery and drying of the polymer. No other antioxidant material was added during the recovery and drying sequence. Polymer B was made by adding the 2 mL isopropyl alcohol before the Irganox 1076 thus effectively preventing coupling of the polymer by the Irganox 1076 since the active polymer-lithium ends had been destroyed. Coagulation, recovery and drying of the polymer were as in polymer A and no other antioxidant material was added in this preparation. The properties of polymers A and B and some polymerization parameters are shown in Table V-A:

TABLE V-A

|  | Polymer A | Polymer B |
| --- | --- | --- |
| n-BuLi, mhm | 1.15 | 0.875 |
| Irganox 1076, phr | 0.2 | 0.2 |
| Inherent Viscosity | 2.16 | 2.24 |
| Heterogeneity Index | 1.20 | 1.06 |
| Mooney Viscosity | 50 | 49.5 |

Polymer A and B then were compared for aging stability at 70° C. in a circulating air oven by following changes in inherent viscosity (I.V.) and gel % over a period of 6 weeks. The results from these tests are shown in Table V-B:

TABLE V-B

| Time, Weeks | Polymer A I.V. (Gel, %) | Polymer B I.V. (Gel, %) |
| --- | --- | --- |
| Unaged | 2.26 (0) | 2.24 (0) |
| 1 | 2.36 (0) | 2.78 (77) |
| 2 | 2.44 (0) | 0.55 (91) |
| 3 | 2.56 (0.9) | — — |
| 4 | 2.93 (21) | — — |
| 5 | 2.71 (36) | — — |
| 6 | 2.16 (77) | — — |

The results in Table V-B clearly show the antioxidant protection afforded Polymer A through the use of Irganox 1076 as a coupling agent whereas the same reagent afforded little or no protection to Polymer B when the coupling reaction was obviated and the polymer coagulated in and recovered from isopropyl alcohol. It is very likely that the coagulation procedure employed essentially "washed out" any unbound Irganox 1076 from the polymers.

EXAMPLE VI

A further study of the aging stability of Polymers A and B was carried out in the following manner. An estimate of the amount of bound Irganox 1076 in Polymer A was made by assuming two polymer molecules combined with one molecule of Irganox 1076. This amount (0.1 phr) of Irganox 1076 was added to Polymer B on a roll mill at 70° C. Polymer A was subjected to the same milling treatment but with no added Irganox 1076. The resulting products (A' and B') were again tested for aging stability at 70° C. in a circulating air oven in the manner of Example V. The results of these tests are shown in Table VI:

TABLE VI

| Time, Weeks | Polymer A' I.V. (Gel %) | Polymer B' I.V. (Gel %) |
| --- | --- | --- |
| Unaged | 2.27 (0) | 2.31 (0) |
| 1 | 2.27 (0) | 2.30 (0) |
| 2 | 2.40 (1) | 2.55 (0) |
| 3 | 2.58 (1) | 2.85 (4) |
| 4 | 2.59 (81) | 1.85 (87) |
| 5 | 1.34 (85) | 1.04 (92) |

These results show an advantage in aging stability of Polymer A' over Polymer B'. Thus, the bound antioxidant of Polymer A' is more effective than the same approximate amount of antioxidant physically admixed with the polymer on a roll mill, polymer B'.

EXAMPLE VII

A polybutadiene (Polymer C) was prepared in the same manner as inventive Polymer A of Example V above except using 1.2 mhm of n-butyllithium initiator instead of 1.15 mhm for Polymer A. Polymer C was evaluated in an aging study at 70° C. as described above along with two commercially available polybutadienes (Polymers D and E) which are prepared in solution polymerization systems with organolithium initiators and stabilized with physically admixed 0.65 phr and 0.4 phr of 2,6-di-tert-butyl-4-methylphenol (BHT) antioxidant respectively. This antioxidant is not believed capable of coupling polymer molecules in the manner of Irganox 1076. The results of the aging study are shown in Table VII:

TABLE VII

| Time, Weeks | Polymer C I.V. (Gel %) | Polymer D I.V. (Gel %) | Polymer E I.V. (Gel %) |
| --- | --- | --- | --- |
| Unaged | 2.03 (0) | 2.06 (0) | 2.21 (0) |
| 1 | 2.02 (0) | 2.08 (0) | 2.23 (0) |
| 3 | 2.24 (0) | 1.18 (91) | 1.33 (91) |
| 5 | 2.40 (2) | 1.39 (91) | 1.28 (75) |
| 8 | 1.73 (46) | 0.66 (85) | — — |

These results shown that inventive Polymer C was more resistant to aging at 70° C. in air than the two commercial polybutadienes D and E.

EXAMPLE VIII

Runs were carried out to observe the coupling behavior of another antioxidant material, tetrakis[3-(3,5-di-tert-butyl-4-hydroxyphenyl)-propionyloxymethyl]methane (Irganox 1010) for polybutadienes. The polymerization and coupling reaction procedures were essentially the same as those employed in Example III. The amount of n-butyllithium employed in these runs was was 1.15 mhm. The results are shown in Table VIII below.

TABLE VIII

| Run No. | Irganox 1010 phr | Coupling Observed[a] Yes (+) or No (−) |
| --- | --- | --- |
| 1[b] | 0.1 | + |
| 2[b] | 0.2 | + |
| 3[b] | 0.4 | + |
| 4[c] | 0.1 | + |
| 5[c] | 0.2 | + |

TABLE VIII-continued

| Run No. | Irganox 1010 phr | Coupling Observed[a] Yes (+) or No (−) |
|---|---|---|
| 6[c] | 0.4 | + |

[a]Determined by examination of the gel permeation chromatogram of a solution of polymer sample in THF. Coupling is indicated by the clear presence of two peaks in the chromatogram in comparison with the control (uncoupled) polymer which shows a single peak.
[b]Used a cyclohexane solution of Irganox 1010, 10g/91.2 mL cyclohexane.
[c]Used a solution of 10g Irganox 1010 in a 91 mL cyclohexane and 1 mL THF.

The results show that Irganox 1010 was effective in coupling polybutadiene under the conditions employed. It was also noted that the size of the coupled polymer peaks in Runs 3 and 6 were smaller than those in the other runs.

EXAMPLE IX

Other runs were carried out to observe the coupling behavior of the antioxidant material Irganox 259, 1,6-hexanediyl di[3-(3,5-di-tert-butyl-4-hydroxyphenyl)-propanoate]. Coupling was examined in the same manner as described in Example VIII above. The results are shown in Table IX:

TABLE IX

| Run No. | Irganox 259 phr | Coupling Observed Yes (+) or No (−) |
|---|---|---|
| 1 | 0.1 | + |
| 2 | 0.2 | + |
| 3 | 0.4 | + |

These results show that Irganox 259 also was effective in coupling polybutadienes under the conditions used.

EXAMPLE X

Other runs were made to observe the coupling behavior of two other antioxidant materials Goodrite 3114 and Mark 1589, each of which is tris-1,3,5-(3,5-di-tert-butyl-4-hydroxyphenylmethyl)-1,3,5-triazacyclohexan-2,4,6-trione. Coupling was examined in the same manner as described in Example VIII above. The results are shown in Table X-A:

TABLE X-A

| Run No. | Goodrite 3114 phr | Mark 1589 phr | Coupling Observed Yes (+) or No (−) |
|---|---|---|---|
| 1 | 0.1 | 0 | (a) |
| 2 | 0.2 | 0 | (a) |
| 3 | 0.4 | 0 | (a) |
| 4 | 0 | 0.1 | (a) |
| 5 | 0 | 0.2 | (a) |
| 6 | 0 | 0.4 | (a) |

(a) Little if any coupling was observed in these runs.

It is suspected that solubility problems of the antioxidants in cyclohexane may have been responsible for the apparent lack of coupling.

In view of the results in Table X-A, other runs with the same reagents were conducted in the same manner as those in Table X-A with the exception that the solution of antioxidant materials in cyclohexane were each further diluted with THF (20 mL). The original mixtures were made of 10 g Mark 1589 in 94.3 mL cyclohexane and 7.8 g Goodrite 3114 in 65.3 mL cyclohexane. The results of these further runs are shown in Table X-B:

TABLE X-B

| Run No. | Goodrite 3114 phr | Mark 1589 phr | Coupling Observed Yes (+) or No (−) |
|---|---|---|---|
| 1 | 0.1 | 0 | + |
| 2 | 0.2 | 0 | + |
| 3 | 0.4 | 0 | − |
| 4 | 0 | 0.1 | + |
| 5 | 0 | 0.2 | + |
| 6 | 0 | 0.4 | − |

The results in the runs of Table X-B show that coupling was achieved albeit at a low level when lower amounts of the two antioxidant materials were employed but no evidence of coupling was noted when the higher amounts (0.4 phr) were employed.

EXAMPLE XI

Runs were carried out which examined the coupling behavior of another antioxidant material Irganox 1093 which is di-n-octadecyl 3,5-di-tert-butyl-4-hydroxybenzylphosphonate. The runs were conducted in the same manner as those described in Example VIII (Runs 1–3). The solution of Irganox 1093 was prepared by dissolving 10 g of the material in 90.1 mL of cyclohexane. The runs employed 0.1, 0.2 and 0.4 phr of Irganox 1093 in the respective coupling steps but the GPC results showed no sign of coupling in any of the runs. There was no indication that poor solubility of the material was responsible for the lack of coupling. Thus, the phosphonate type antioxidant represented by Irganox 1093 was not effective for coupling polymer molecules according to the instant invention.

These data illustrate that the coupling agents containing bound antioxidant functional groups not only effectively couple a significant amount of the polymeric lithium (polymer alkali metal) which is present in the polymerization reaction mixture, but produce a polymer exhibiting effective aging stability.

The disclosure, including data, illustrates the value and effectiveness of my invention. The examples, the knowledge and background of the field of the invention, as well as the general principles of chemistry and other applicable sciences, have formed the bases to which the broad description of the invention including the range of conditions and generic groups of operant components have been developed, and further form the bases for my claims here appended.

I claim:

1. A process of treating a living alkali metal-terminated polymer, said polymer selected from conjugated diene polymers, wherein said conjugated diene polymer is a homopolymer or copolymer of a conjugated diene or of a conjugated diene with a comonomer containing a vinylidene group, which comprises contacting said living alkali metal-terminated conjugated diene polymer with an effective coupling amount of an agent selected from the group consisting of:

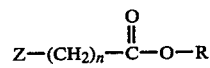

$$Z-(CH_2)_n-\overset{O}{\underset{\|}{C}}-O-R \qquad I$$

wherein Z is the 3,5-di-tert-butyl-4-hydroxyphenyl moiety,

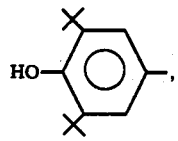

n is 0–4, and R is an alkyl radical of 1–24 carbon atoms,

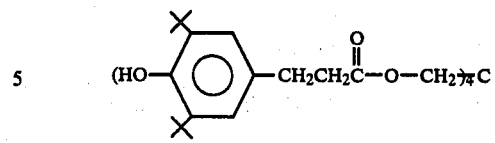

1,6-hexanediyl di[3-(3,5-di-tert-butyl-4-hydroxyphenyl)propanoate]

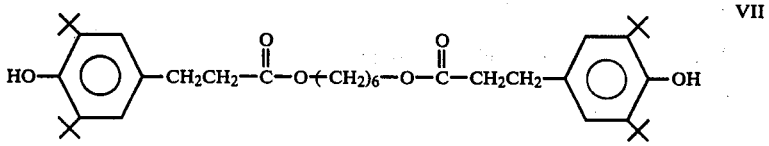

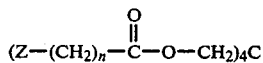

wherein Z and n are as defined above,

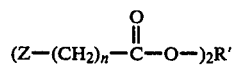

wherein Z and n are as defined above and R' is an alkylene radical of 2–10 carbon atoms; and

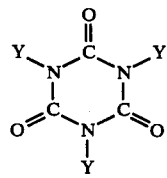

wherein Y is Z—(CH$_2$)$_n$—, and Z and n are as defined above, and mixtures, thereby resulting in a coupled conjugated diene polymer of increased molecular weight exhibiting aging stability.

2. The process according to claim 1 employing in the range of about 0.01 to 2 phr coupling agent.

3. The process according to claim 1 employing about 0.03 to 1.5 phr said coupling agent.

4. The process according to claim 3 wherein said coupling agent is selected from the group consisting of: n-octadecyl[3-(3,5-di-tert-butyl-4-hydroxyphenyl)]-propanoate

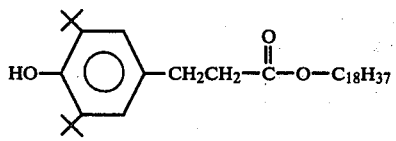

tetrakis[3-(3,5-di-tert-butyl-4-hydroxyphenyl)propionyloxymethyl]methane tris-1,3,5-(3,5-di-tert-butyl-4-hydroxyphenylmethyl-1,3,5-triazacyclohexan-2,4,6-trione; and

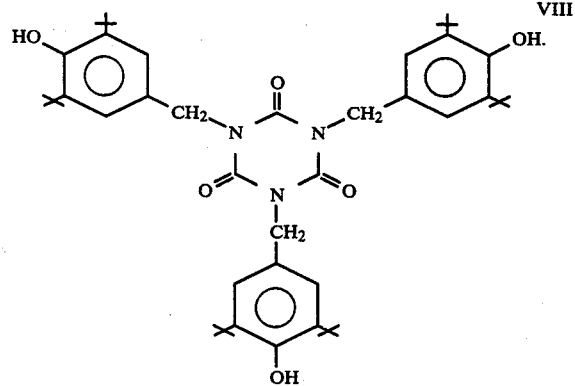

5. The process according to claim 2 wherein said coupling agent is said I.

6. The process according to claim 2 wherein said coupling agent is said II.

7. The process according to claim 2 wherein said coupling agent is said III.

8. The process according to claim 2 wherein said coupling agent is said IV.

9. The process according to claim 5 wherein said coupling agent is said V.

10. The process according to claim 6 wherein said coupling agent is said VI.

11. The process according to claim 7 wherein said coupling agent is VII.

12. The process according to claim 8 wherein said coupling agent is VIII.

13. The process according to claims 9, 10, 11, or 12 wherein said conjugated diene polymer is a polymer of butadiene, isoprene, or either of these with styrene.

14. An age-resistant polymer produced by the process of treating a living alkali metal-terminated polymer selected from conjugated diene homopolymers, copolymers, or copolymers of a conjugated diene with a comonomer containing a vinylidene group, which comprises contacting said living alkali metal-terminated conjugated diene polymer with an effective coupling amount of

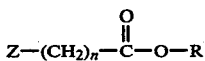

wherein Z is the 3,5-di-tert-butyl-4-hydroxyphenyl moiety

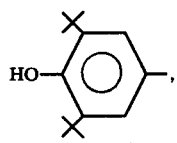

n is 0–4, and R is an alkyl radical of 1–24 carbon atoms;

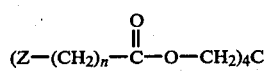   II wherein Z and n are as defined above;

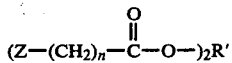   III wherein Z and n are as defined above and R' is an alkylene radical of 2–10 carbon atoms; and

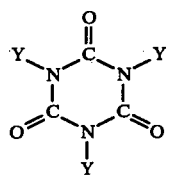   IV wherein Y is Z—(CH$_2$)$_n$—, and Z and n are as defined above, and mixtures, thereby resulting in a coupled conjugated diene polymer of increased molecular weight exhibiting aging stability.

15. The polymer according to claim 14 employing in the range of about 0.01 to 2 phr coupling agent.

16. The polymer according to claim 14 wherein said coupling agent is selected from the group consisting of: n-octadecyl[3-(3,5-di-tert-butyl-4-hydroxyphenyl)]-propanoate

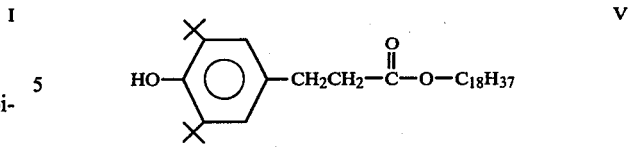   V tetrakis[3-(3,5-di-tert-butyl-4-hydroxyphenyl)propionyloxymethyl]methane

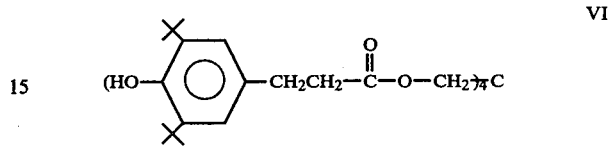   VI 1,6-hexanediyl di[3-(3,5-di-tert-butyl-4-hydroxyphenyl)propanoate]

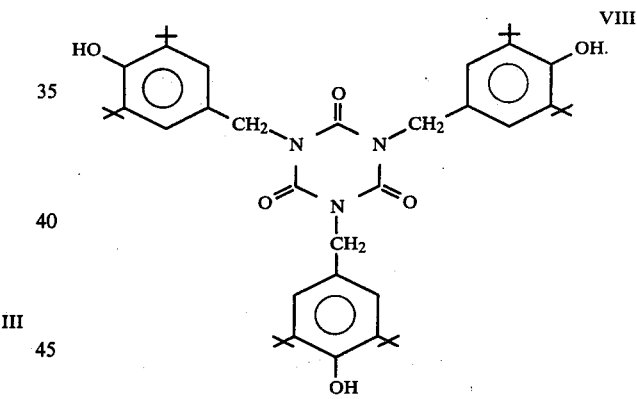   VII tris-1,3,5-(3,5-di-tert-butyl-4-hydroxyphenylmethyl-1,3,5-triazacyclohexan-2,4,6-trione; and

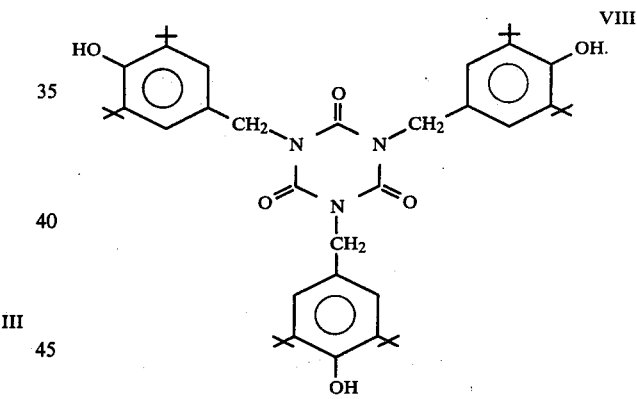   VIII

17. The polymer according to claim 15 wherein said coupling agent is said I.
18. The polymer according to claim 15 wherein said coupling agent is said II.
19. The polymer according to claim 15 wherein said coupling agent is said III.
20. The polymer according to claim 15 wherein said coupling agent is said IV.
21. The polymer according to claim 17 wherein said coupling agent is said V.
22. The polymer according to claim 18 wherein said coupling agent is said VI.
23. The polymer according to claim 19 wherein said coupling agent is said VII.
24. The polymer according to claim 20 wherein said coupling agent is said VIII.
25. The polymer according to claim 21, 22, 23, or 24 wherein said conjugated diene polymer is a polymer of butadiene, isoprene, or either of these with styrene.

* * * * *